Jan. 17, 1967 C. W. HAHN 3,298,567
ARTICLE DISPENSER PROVIDED WITH MEANS TO DISCHARGE ARTICLE
FROM FLEXIBLE CELLULAR MAGAZINES
Filed March 19, 1965 4 Sheets-Sheet 1
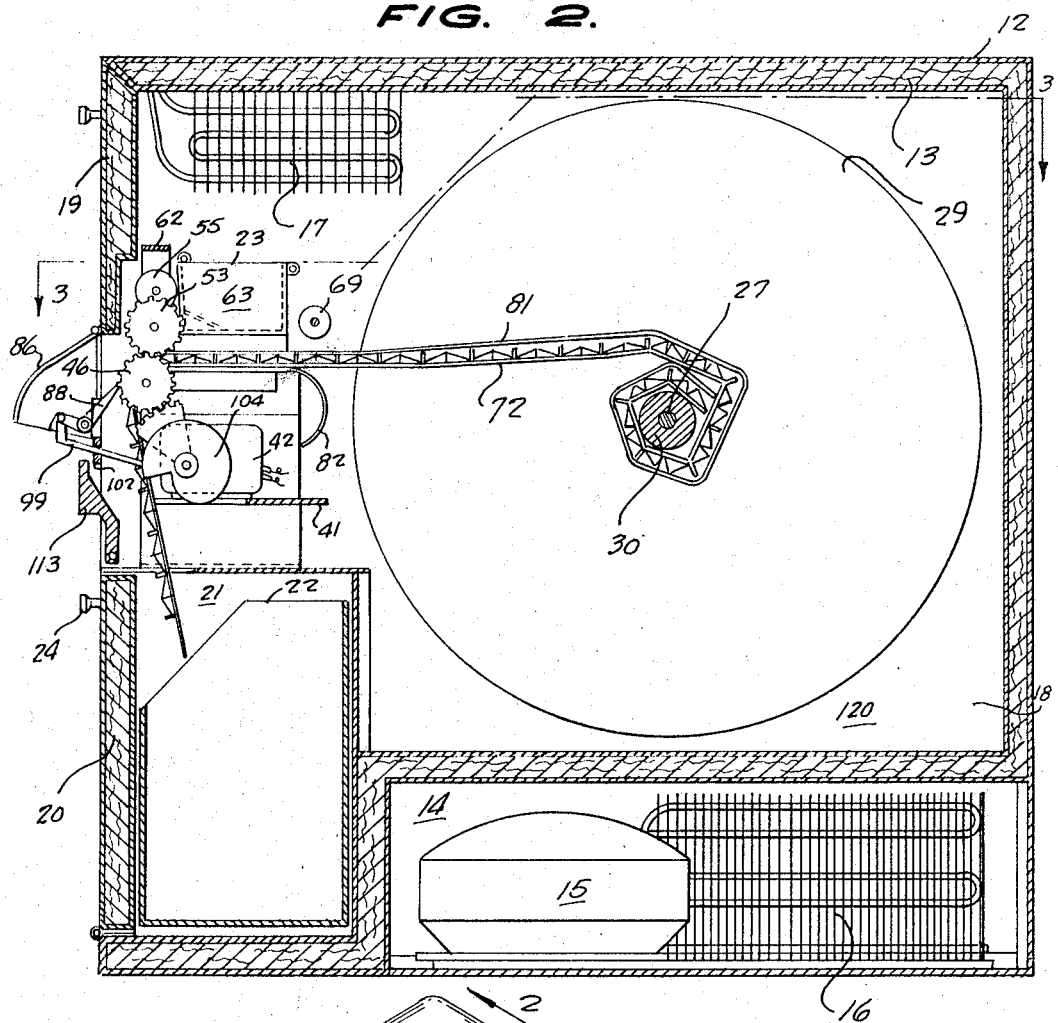
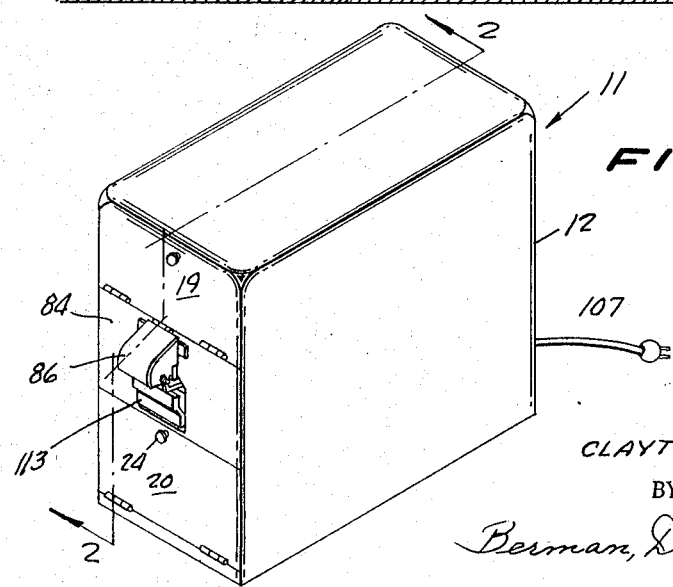
INVENTOR.
CLAYTON W. HAHN,
BY
Berman, Davidson + Berman
ATTORNEYS.

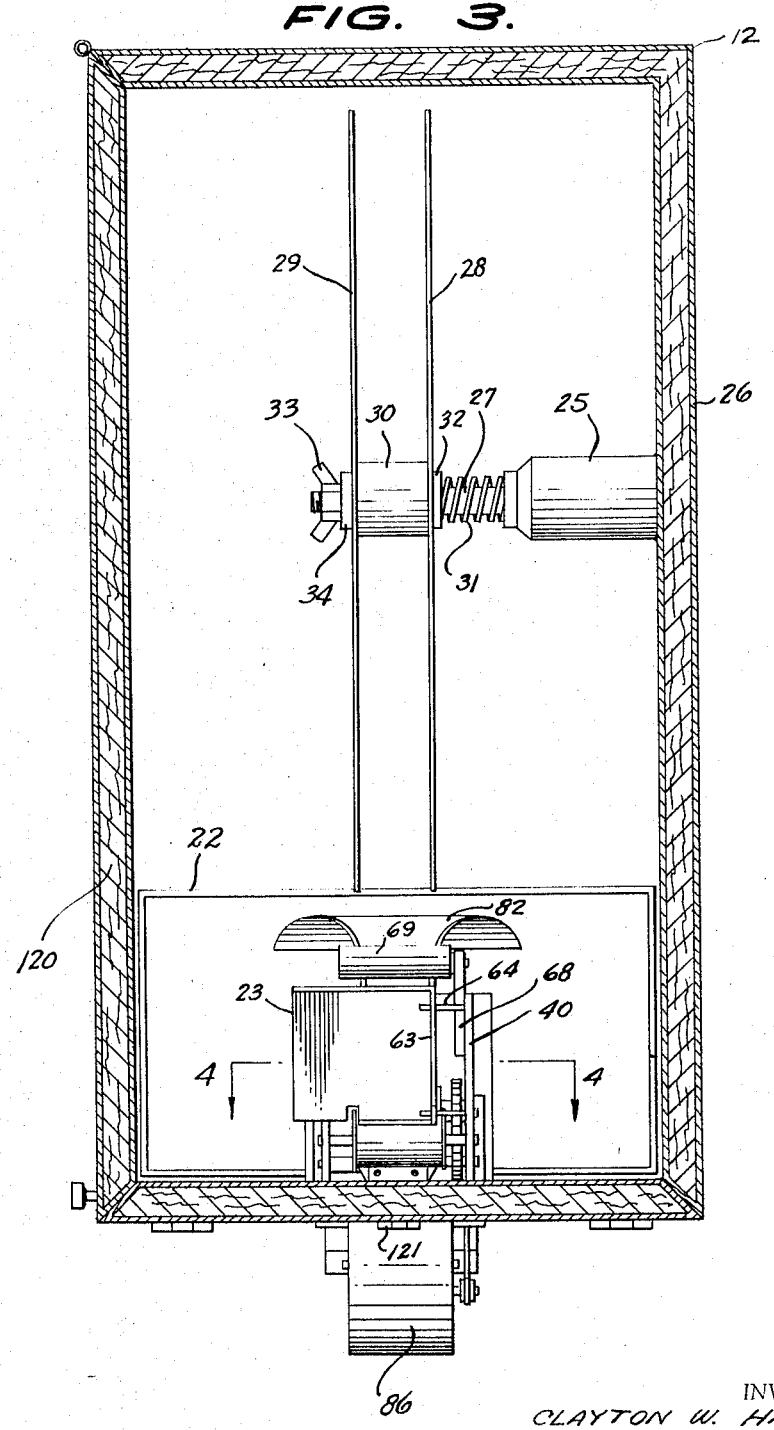

Jan. 17, 1967  C. W. HAHN  3,298,567
ARTICLE DISPENSER PROVIDED WITH MEANS TO DISCHARGE ARTICLE
FROM FLEXIBLE CELLULAR MAGAZINES
Filed March 19, 1965  4 Sheets-Sheet 3
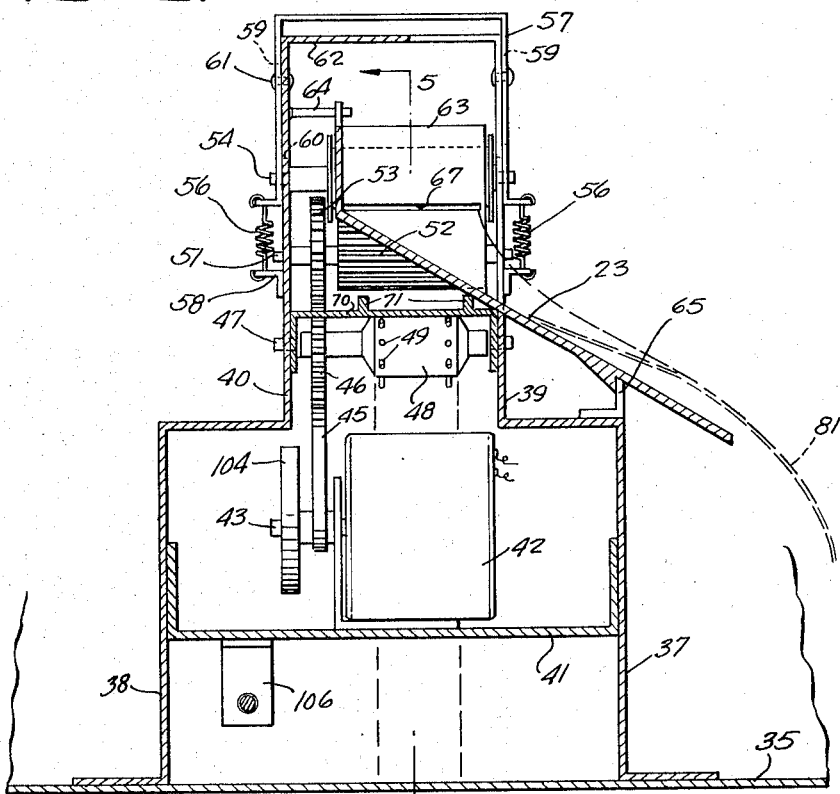
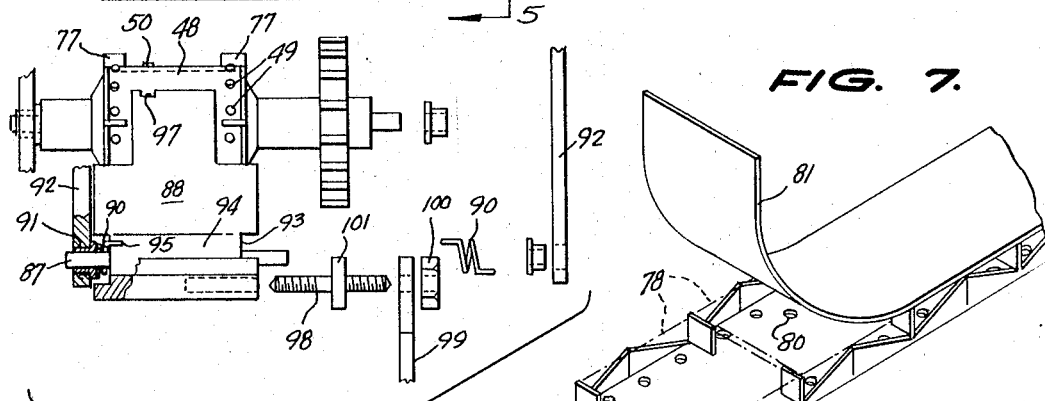
INVENTOR.
CLAYTON W. HAHN,
BY
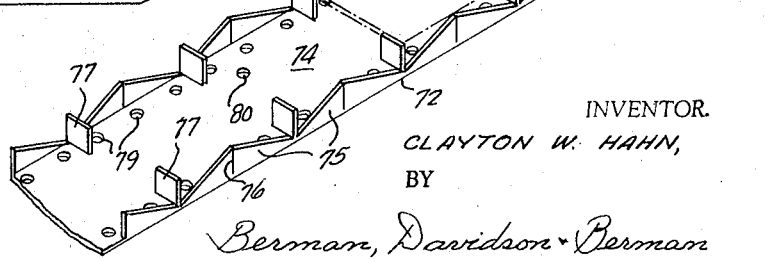
ATTORNEYS.

United States Patent Office 3,298,567
Patented Jan. 17, 1967

---

3,298,567
ARTICLE DISPENSER PROVIDED WITH MEANS TO DISCHARGE ARTICLE FROM FLEXIBLE CELLULAR MAGAZINES
Clayton W. Hahn, 1516 Sunrise Rim Road,
Boise, Idaho 83705
Filed Mar. 19, 1965, Ser. No. 441,133
10 Claims. (Cl. 221—74)

This invention relates to article dispensing apparatus, and more particularly to a device for mechanically dispensing pats or blocks of butter or oleomargarin, or similar material without the necessity of handling same with tongs, forks or other implements.

A main object of the invention is to provide a novel and improved article dispensing apparatus for mechanically dispensing blocks of butter, oleomargarin, or similar articles without the necessity of employing forks, tongs or other implements, the apparatus being simple in construction, being reliable in operation, and providing a substantial saving in time in dispensing the articles contained therein.

A further object of the invention is to provide an improved storage and dispensing apparatus for butter, oleomargarin, and similar articles in block form, the apparatus being relatively compact in size, being reliable in operation, being provided with its own refrigerating means so that the material contained therein will be kept at the required temperature for maintaining same in good condition and in solid form, and the apparatus being arranged so that the block of butter or oleomargarin dispensed thereby will be automatically dropped into a plate or dish positioned in contact with a portion of the apparatus, thereby providing rapid and reliable dispensing of the block of butter, oleomargarin, or similar material.

A still further object of the invention is to provide an improved dispensing device for quickly and efficiently dispensing blocks of butter, oleomargarin, or similar food material, the apparatus being rugged in construction, being easy to keep clean, and having substantial storage capacity, whereby a large number of pats of butter or oleomargarin may be stored therein preparatory to dispensing same.

A still further object of the invention is to provide an improved mechanical dispenser for blocks of food material, such as butter, oleomargarin, or the like, the apparatus being neat in appearance, being thermally insulated so that the material stored therein is protected against deterioration, being easy to refill, when required, and being arranged so that the blocks of butter, oleomargarin, or other material stored therein are dispensed without the necessity of touching these articles and without requiring the use of implements, such as forks, tongs, or the like, whereby the dispensed articles will not be contaminated by contact with any objects other than the elements on which they are supported in the apparatus.

Further objects and advantages of the invention will become apparent from the following description and claims, and from the accompanying drawings, wherein:

FIGURE 1 is a perspective view of an improved butter or oleomargarin dispensing device constructed in accordance with the present invention.

FIGURE 2 is an enlarged vertical cross sectional view taken substantially on the line 2—2 of FIGURE 1.

FIGURE 3 is an enlarged horizonal cross sectional view taken substantially on the line 3—3 of FIGURE 2.

FIGURE 4 is a fragmentary vertical cross sectional view taken substantially on the line 4—4 of FIGURE 3.

FIGURE 6 is an elevational view, partly in cross section, showing portions of the drive mechanism for the dispensing device of FIGURES 1 to 5, said portions being shown in separated positions.

FIGURE 7 is an enlarged fragmentary perspective view showing a portion of the conveyor belt member and associated cover strip, as employed in the dispensing device of FIGURES 1 to 6.

Figure 5:
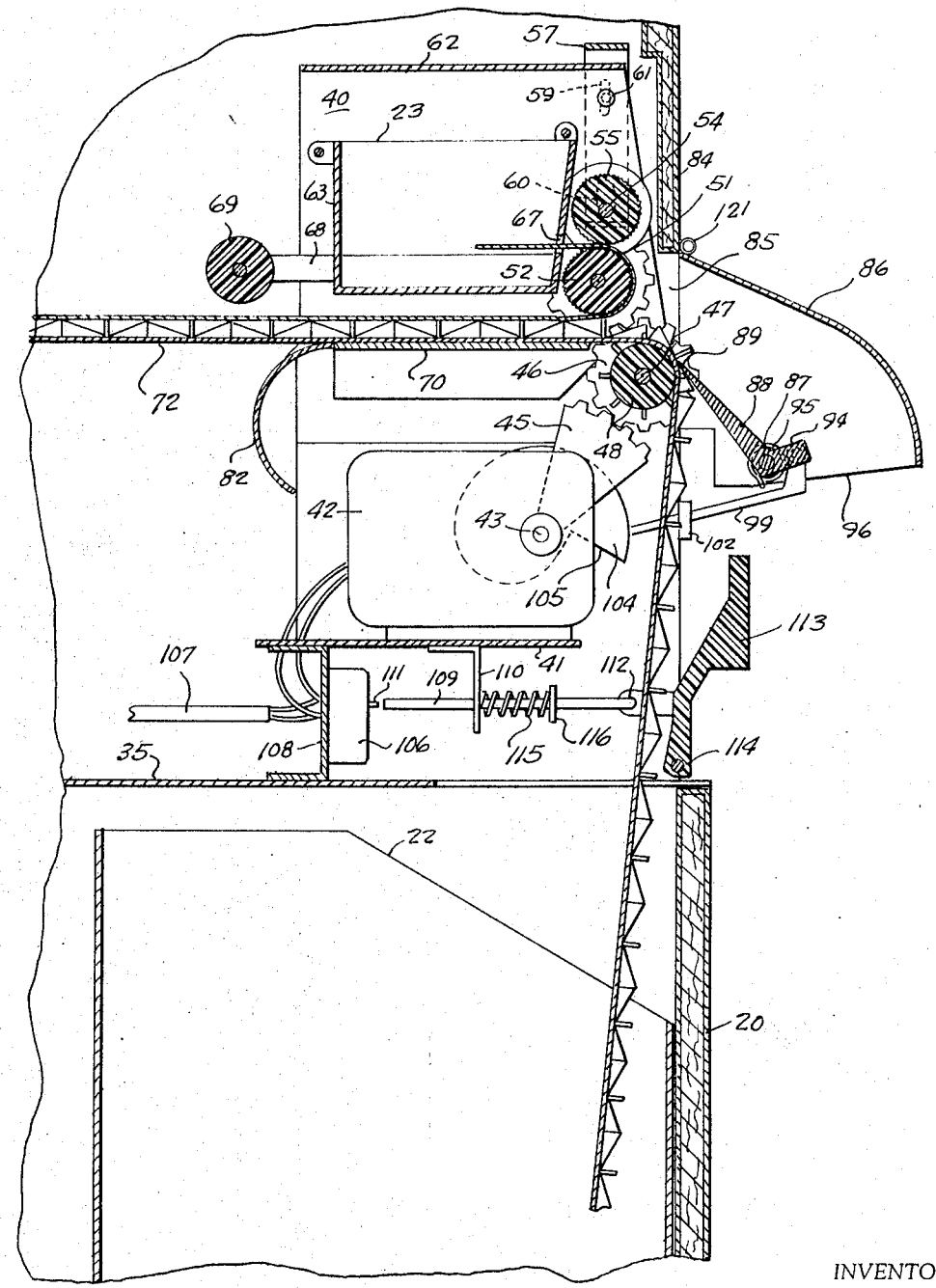
FIGURE 5 is vertical cross sectional view taken substantially on the line 5—5 of FIGURE 4.

Referring to the drawings, 11 generally designates a dispensing apparatus according to the present invention. The apparatus 11 comprises a generally rectangular main housing 12 whose walls are suitably thermally insulated, for example, are hollow and are filled with thermal insulating material 13, shown in FIGURE 2, such as cork, or the like. The main housing includes a bottom rear compartment 14 containing conventional refrigeration mechanism, including a compressor 15, a condenser 16, and other elements required to form a refrigeration unit. The refrigeration apparatus includes an evaporation coil 17 which is mounted in the upper portion of the main insulated compartment 18 of housing 12, and the evaporation coil 17 is connected in the refrigeration circuit in the conventional manner so as to maintain the main compartment 18 at a temperature sufficiently low to preserve food articles, such as butter, oleomargarin, or the like, and to maintain them in a solid condition.

The front wall of the housing 12 is provided with a hinged top door 19 which gives access to the upper front portion of the housing and with another hinged door 20 which provides access to the lower front portion of the housing. Thus, the lower door 20 is hinged on a horizontal axis located adjacent the bottom margin of the front wall of the housing 12, providing access to a compartment 21 in the housing which contains a removable receptacle 22, said receptacle being removable through the doorway of the hinged member 20 when said hinged member is in a substantially horizontal position. Similarly, when the upper door 19 is swung to an open position, access is provided to the space subjacent the evaporation coil 17 and a guide chute 23 mounted in this region.

The hinged doors 19 and 20 are provided with suitable outwardly projecting handles 24 and with conventional yieldable catch means, not shown, for holding the doors in closed positions.

A transversely extending horizontal post member 25 is secured internally to the intermediate portion of one of the side walls 26 of main housing 12, said post member being formed with a reduced shaft portion 27 on which are rotatably mounted a pair of vertical parallel rigid disc members 28 and 29, said disc members being spaced apart by a spacer sleeve 30 mounted on the shaft member 27 between the disc members, as shown in FIGURE 3. A coiled spring 31 surrounds the shaft member 27, bearing between the end of post member 25 and a washer 32 disposed on shaft portion 27 adjacent disc member 28, the force of spring 31 being opposed by a wing nut 33 threaded on the end of shaft portion 27 and bearing against a washer 34 interposed between the wing nut and disc member 29. The spring 31 provides a frictional retarding force which prevents the disc members 28 and 29 from rotating freely but which is nevertheless small enough to be overcome when sufficient torque acts on the disc members or on the spacer member 30 interposed therebetween.

The compartment 21 is provided with the horizontal top wall 35 on which is mounted a supporting frame comprising upstanding side plates 37 and 38 having inwardly offset top portions 39 and 40. Rigidly secured between the intermediate portions of the side plates 37 and 38 is a horizontal cross plate 41 on which is mounted an electric motor 42 having a horizontal shaft 43, as shown in FIGURE 4. Secured on the shaft 43 is a gear sector 45 which is meshingly engageable with a gear 46 secured on a horizontal shaft 47 journaled between the inwardly offset vertical plate portions 39 and 40. Also secured on shaft 47 is a drive roller 48 provided adjacent its ends with outwardly projecting radial drive sprocket pins 49. The roller 48 is also provided inwardly of the marginal sprocket pins 49 with at least one aligning stud 50 for a purpose presently to be described.

As will be presently explained, each rotation of shaft 43 causes sector gear 45 to mesh with gear 46 and rotate gear 46 through a sufficient angle to feed a single pat of butter or oleomargarin carried on the dispensing belt of the device.

Horizontally journaled between the plate elements 39 and 40 above shaft 47 is another shaft 51 on which is secured a longitudinally serrated roller 52 which is located above and slightly rearwardly of the driving roller 48, and on which is also secured a gear 53 which meshes with gear 46. Another shaft 54 is journaled horizontally between the upstanding plate elements 39 and 40 above and parallel to shaft 51, and secured on shaft 54 is another longitudinally serrated roller 55 which is urged toward clamping engagement with the roller 52 by the biasing action of a pair of coiled springs 56, 56 connected between the bottom ends of the arms of a U-shaped bracket 57 and angle brackets 58 secured to the respective plate elements 39 and 40. The U-shaped bracket 57 is slidably connected to the plate elements 39 and 40, and the ends of the shaft 54 are rotatably secured to the legs of the bracket 57, respective vertical slots 59 and 60 being provided in the side arms of the bracket 57 and in the plate elements 39 and 40 to receive retaining rivets 61 slidably connecting the upper portions of said side arms to the plate elements 39 and 40, and the ends of the shaft 54.

The plate elements 39 and 40 are integrally connected by a horizontally extending top plate member 62 which overlies the top box-like portion 63 of a downwardly and laterally inclined chute member 23. As shown in FIGURE 4, the chute member 23 is suitably secured between the plate elements 39 and 40 beneath the top cross member 62, for example, by fastening pins 64, extending downwardly and laterally through a notch in the plate element 39 and being supported on and secured to at least one angle bracket 65 mounted on the corner shoulder defined at the offset of the plate member 37. As shown in FIGURE 3, the chute member 23 leads downwardly toward the receptacle 22.

A horizontal slot 67 is provided in the front wall of the box-like chute portion 63 for a purpose presently to be described. Secured to the plate element 40 and extending rearwardly therefrom is a bar bracket 68 to the end of which is journaled a horizontal guide roller 69 which extends parallel to the rollers 52 and 55 but which is located rearwardly of the box-like chute element 63.

Secured between the vertical plate elements 39 and 40 at a horizontal level which is substantially tangent to the drive roller 48 at its upper portion is a supporting plate 70 formed with a pair of spaced upstanding guide ribs 71, 71 located adjacent the respective opposite ends of the drive roller 48 and defining a guide channel therebetween. The guide channel defined between the ribs 71, 71 is adapted to slidably receive a flexible conveyor belt element 72 carrying the pats of butter, oleomargarin, or other food material to be dispensed.

The conveyor belt 72 comprises an elongated body of suitable flexible, substantially chemically inert material, such as molded plastic, or any suitable rubber-like material which can be easily molded and which possesses sufficient flexibility to be coiled around the central shaft member 30 provided between the guide discs 29 and 28. The elongated belt member 72 comprises a web portion 74 formed with upstanding, generally triangular serrations 75 along its side margins, said serrations being vertically split at their center portions, as shown at 76 to permit easy flexing of the web member 74 when it is coiled in the manner illustrated in FIGURE 2. The web member 74 is integrally formed substantially at the junctions of the successive serrations 75 with transversely arranged upstanding pairs of lugs 77, 77 which cooperate with the longitudinal serrations 75 to define generally rectangular enclosures adapted to receive correspondingly shaped pats of butter or oleomargarin, for example, as shown in dotted view at 78 in FIGURE 7. The web portion 74 is formed along its side margins with uniformly spaced sprocket apertures 79 engageable by the sprocket pins 49 of the roller 48, and is further formed with apertures 80 engageable by the aligning pin or lug 50 to maintain the belt 72 in proper alignment on the roller 48. If one lug 50 is provided on the roller 48, said lug will engage in an aperture 80 once during every revolution of the roller 48, and the apertures 80 are correspondingly spaced to receive the lug 50.

A flexible removable cover strip 81, which may be of thin sheet plastic material or of suitable paper, such as parchment paper, is provided on the belt 72 overlying the pieces of butter or oleomargarin 78, to prevent the butter or oleomargarin from sticking to the bottom of the web 74 when the belt is coiled up between the guide discs 28 and 29 in the manner illustrated in FIGURE 2. The strip 81 is coextensive in length with the belt 72, and is automatically removed as the blocks of butter or oleomargarin are dispensed, as will be presently described.

To facilitate the movement of the belt 72 into the guide channel defined on the member 70 between the ribs 71, 71, the rear end portion of the member 70 is provided with an arcuately curved entry guide flange 82 depending from the rear edge of member 70, as shown in FIGURE 5, thereby presenting a smooth arcuately curved entry surface for guiding the belt 72 into the channel defined between the ribs 71, 71 and for preventing damage to the belt 72 as it is drawn through the guide channel defined between said ribs 71, 71.

The front wall of housing 12, designated at 84, is formed with a discharge aperture 85 located forwardly adjacent the rollers 48 and 52, said aperture being provided with a forwardly projecting, downwardly opening protective hood 86 of sheet metal, or of any other suitable thin rigid sheet material. Pivoted transversely between the lower marginal portions of the side walls of hood 86 is a shaft 87 on which is secured an outwardly rigid flap member 88 whose tapered free edge portion 89 normally extends adjacent the portion of web 74 engaged on roller 48, the flap member 88 being somewhat less in width than the spacing between the lugs 77, 77 on web 74 so that it is receivable therebetween. The flap member 88 is biased in a clockwise direction, as viewed in FIGURE 5, by coiled springs 90, 90 shown in FIGURE 6. Thus, the ends of the shaft 87 are received in bearing bushings 91 mounted in the respective side walls 92, 92 of hood 86, and the coiled springs 90 are mounted on the shaft 87 and are received in notches 93 provided in the member 88, the ends of the springs bearing respectively on member 88 and on side walls 92 and the springs being tensed so as to exert the aforesaid biasing force on the member 88. Thus, the member 88 is formed with the forwardly projecting arm portion 94 against which the top ends 95 of the coiled springs bear, whereas the bottom ends of the coiled springs are engaged beneath the bottom edges 96 of side walls 92, so that the springs bias the flap member 88 in a clockwise direction, as viewed in FIGURE 5.

As shown in FIGURE 6, the flap member 88 may have its top portion of reduced width so as to be receivable between the side marginal pairs of lugs 77, 77 on the belt 72. The free outer edge of flap member 88 is provided with a notch 97 to provide clearance for the aligning lug 50.

A pivot stud 98 is threaded into one side edge of the arm 94 and a generally L-shaped follower rod 99 is pivotally mounted on the stud 98, being held thereon by a nut 100 but being freely rotatable on the stud, the rod 99 being thus positioned between the nut 100 and an integral collar 101 provided on the stud. The follower rod 99 extends slidably through a supporting ring 102 secured to the housing front wall 84 adjacent one side edge of the aperture 85, the ring 102 being substantially larger in inside diameter than the diameter of the rod 99 so as to permit the rod 99 to angle freely therein. Rod 99 is supported on the ring 102 so that its free end engages the periphery of a spiral cam 104 secured on the motor shaft 43 so that with each revolution of the motor shaft, the rod 99 will slip past the transition shoulder 105 connecting the maximum radius portion of the cam with the minimum radius portion thereof, thus releasing the follower rod 99 once during each counterclockwise revolution of shaft 43, as viewed in FIGURE 5, and thereby allowing the springs 90, 90 to rotate the flap member 88 in a clockwise direction from the position thereof shown in FIGURE 5 to a substantially horizontal position in the forward portion of the space defined beneath the hood member 86. As will be apparent from FIGURE 5, the flap member 88 is normally positioned so as to engage beneath and to receive a block of butter or oleomargarin carried on the web 74 as the belt 72 is moved to the right, as viewed in FIGURE 5, so that when the follower rod 99 is released by the counterclockwise rotation of cam 104, as above described, the block of butter or oleomargarin carried thereon is rotated clockwise as viewed in FIGURE 5 and is allowed to drop downwardly from member 88 as said member reaches a substantially horizontal position in the forward portion of the space under hood 86.

The motor 42 is energized from a suitable source of current through conductors of a supply cord 107 and through a normally open snap switch 106 mounted on a bracket 108 secured beneath the rear marginal portion of plate member 41. An operating rod 109 is slidably supported in a depending angle bracket 110 secured to plate member 41, the operating rod 109 being aligned with the snap switch operating plunger 111, as shown in FIGURE 5, and being pivotally connected to a lug 12 projecting rearwardly from an upstanding abutment arm 113 pivoted at 114 in the lower portion of the aperture 85. A coiled spring 115 is mounted on the rod 109, bearing between bracket 110 and an abutment collar 116 secured on rod 109, biasing the rod toward the right, as viewed in FIGURE 5, namely, toward a position wherein the free end of rod 109 is spaced a short distance forwardly of the operating plunger 11 of snap switch 106. When the arm 113 is rotated to the left, namely, in a counterclockwise direction, as viewed in FIGURE 5, for example by being engaged by a plate or dish, the rod 109 is moved leftward from the position thereof shown in FIGURE 5 sufficiently to engage the operating plunger 111 of snap switch 106, causing the motor 42 to become energized.

The pins 49 are engaged in the apertures 79 of web 74 and the end portion of the flexible strip 81 is threaded upwardly between the serrated rollers 52 and 55 in the manner shown in FIGURE 5, being passed through the slot 67 so that it is fed into the chute 63 automatically as the belt 72 is advanced. The forward end portion of belt 72 extends over the roller 48 and depends downwardly into the receptacle 22, as shown in FIGURE 5.

When motor 42 is energized, the gear sector 45 engages gear 46 meshingly and rotates the drive roller 48 sufficiently in a clockwise direction, as viewed in FIGURE 5 to move a block of butter or oleomargarin onto the member 88. Thus, shaft 43 rotates counterclockwise, as viewed in FIGURE 5, and the gear sector 45 rotates gear 46 clockwise. As the gear sector 45 disengages from the gear 46, completing the feeding movement of the belt 72, the cam 104 reaches a position wherein the rod 99 slips past the transition shoulder 105, releasing the flap member 88 and causing said flap member to be rotated clockwise in the manner above described so as to discharge the block of butter or oleomargarin onto the subjacent dish or plate engaged against the actuating arm 113. Thus, the motor 42 will continue to be energized as long as the arm 113 is pressed inwardly sufficiently to close switch 106, and pats of butter will be intermittently delivered, namely, a pat of butter or oleomargarin will be dispensed each time the sector gear 45 drives gear 46. The empty belt 72 is fed downwardly into the receptacle 22, and the cover strip 81 is likewise fed between the rollers 55 and 52 and through the slot 67 into the chute 23, being subsequently delivered into said receptacle 22 as illustrated in FIGURE 4.

As will be readily apparent, when it is desired to dispense a block of butter or oleomargarin, it is merely necessary to engage the edge of a dish or plate against the member 113 and press the member 113 inwardly sufficiently to energize the motor 42, the abutment of the dish or plate with member 113 being maintained until a block of butter or oleomargarin has been delivered, after which the plate or dish is moved away, allowing the snap switch 106 to open and thereby deenergizing the motor 42.

As shown in FIGURE 3, the housing 12 is provided with a hinged side wall 120 opposite the fixed side wall 26, the hinged side wall being provided with releasable catch means to hold same in a closed position but to permit the side wall to be swung open at times, namely, to provide access to the interior of the housing for the purpose of removing or replacing the assembly comprising the reel shaft element 30 and its disc members 29 and 28, along with a fresh belt 72 carrying blocks of butter, oleomargarine, or other food material thereon. Thus, when the door 120 is opened, the wing nut 33 may be removed, allowing the removal of the elements 28, 29 and 30. When an empty assembly of these elements has been removed, it may be replenished with a new belt carrying blocks of food material thereon and replaced on the shaft member 27. When the reel assembly carrying the new belt is mounted in the housing, the end of the belt may be threaded between the sprocket roller 48 and the cooperating guide roller 52 in the manner previously described, with the end of the associated cover strip 81 engaged around the roller 52 and threaded through the slot 67.

To facilitate the replacement of the conveyor belt member 72, it may be merely necessary to remove the disc member 29, exposing the supporting roller 30, and thereby allowing the replacement belt to be spirally wound thereon and providing ample clearance for pushing the end of the conveyor belt through the guideway defined between the ribs 71, 71 on member 70 and into engagement with the sprocket roller 48. After the belt has been thus mounted, with the free end portion of the belt received under the flap member 48 and with the associated end portion of the cover strip 81 engaged around roller 52 and through slot 67, the disc member 29 may be replaced on the shaft member 27, after which washer 34 may be placed thereon and wing nut 33 engaged on the end of said shank member 27 and tightened to a degree providing the desired tension of spring 31.

The hood member 86 is preferably hinged to the top margin of the aperture 85 in front wall 84, as shown at 121, whereby said hood member may be readily lifted to provide access to the flap member 88 and associated elements to facilitate their cleaning, when required. By hinging the hood member 86, as above mentioned, it is also possible to provide free access to the space therebeneath during the process of engaging the free end of the conveyor belt 72 around the sprocket roller 48 and beneath the flap member 88, as abovementioned, and for also engaging the end portion of the cover strip 81 around the roller 52 and through the slot 67.

While a specific embodiment of an improved device for dispensing blocks of butter, oleomargarine, or similar material has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A dispensing device comprising a housing having a front wall provided with a dispensing opening, a belt support member rotatably mounted in said housing, a flexible belt member wound on said support member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, means to intermittently rotate said feed roller in steps, a flap member having a tapered end, means pivotally supporting said flap member forwardly adjacent said feed roller and with said tapered end overlying and in contact with the belt member, whereby to receive a block of food material at each step of rotation of the feed roller, and means rotating the flap member outwardly through a sufficient angle to discharge a block of food material thereon after each step of rotation of the feed roller.

2. A dispensing device comprising a housing having a front wall provided with a dispensing opening, a belt support member rotatably mounted in said housing, a flexible belt member wound on said support member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, a gear on the feed roller, a sector gear rotatably mounted in the housing and being meshingly engageable with said first-named gear, means to rotate said sector gear continuously, whereby to intermittently rotate said feed roller in steps, a flap member, means pivotally supporting said flap member forwardly adjacent said feed roller and in contact with the belt member, whereby to receive a block of food material at each step of rotation of the feed roller, and means rotating the flap member outwardly through a sufficient angle to discharge a block of food material thereon after each step of rotation of the feed roller.

3. A dispensing device comprising a housing having a front wall provided with a dispensing opening, a belt support member rotatably mounted in said housing, a flexible belt member wound on said support member and having longitudinally spaced sprocket holes, a feed roller journaled in the housing adjacent said dispensing opening, outwardly projecting sprocket pins on the feed roller interlocking with the sprocket holes of the belt member to feed the belt member toward the opening responsive to rotation of the feed roller, means on the belt member defining successive compartments to supportingly receive blocks of food material, means to intermittently rotate said feed roller in steps, a flap member having a tapered end, means pivotally supporting said flap member forwardly adjacent feed roller and with said tapered end overlying and in contact with the belt member, whereby to receive a block of food material at each step of rotation of the feed roller, and means rotating the flap member outwardly through a sufficient angle to discharge a block of food material thereon after each step of rotation of the feed roller.

4. A dispensing device comprising a housing having a front wall provided with a dispensing opening, a reel member rotatably mounted in said housing, yieldable friction means exerting rotation-retarding force on said reel member, a flexible belt member wound on said reel member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, means to intermittently rotate said feed roller in steps, a flap member having a tapered end, means pivotally supporting said flap member forwardly adjacent said feed roller with said tapered end overlying and substantially in contact with the belt member, each step of rotation of the feed roller being sufficiently long to deposit a block of food material from a belt compartment onto the flap member, and means rotating the flap member outwardly through a sufficient angle to discharge a block of food material thereon after each step of rotation of the feed roller.

5. A dispensing device comprising a housing having a front wall provided with a dispensing opening, a reel member rotatably mounted in said housing, yieldable friction means exerting rotation-retarding force on said reel member, a flexible belt member wound on said reel member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, means to intermittently rotate said feed roller in steps, a flap member having a tapered end, means pivotally supporting said flap member forwardly adjacent said feed roller with said tapered end overlying and substantially in contact with the belt member, each step of rotation of the feed roller being sufficiently long to deposit a block of food material from a belt compartment onto the flap member, means biasing said flap member toward an outwardly rotated inverted position, a rotary cam coupled to the means for intermittently rotating the feed roller, and follower means connected to the flap member and engaging said cam to normally hold the flap member in overlying relation to the belt member, said cam being formed to release the follower means after each step of rotation of the feed roller, whereby to allow the flap member to rotate to said inverted position.

6. A dispensing device comprising a housing having a front wall provided with a dispensing opening, a reel member rotatably mounted in said housing, yieldable friction means exerting rotation-retarding force on said reel member, a flexible belt member wound on said reel member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, a gear on the feed roller, a sector gear rotatably mounted in the housing and being meshingly engageable with said first-named gear, means to rotate said sector gear continuously, whereby to intermittently rotate said feed roller in steps, a flap member having a tapered end, means to pivotally support said flap member forwardly adjacent said feed roller with said tapered end overlying and substantially in contact with the belt member, each step of rotation of the feed roller being sufficiently long to deposit a block of food material from a belt compartment onto the flap member, means biasing said flap member toward an outwardly rotated inverted position, a rotary cam coupled to the sector gear, and follower means connected to the flap member and engaging said cam to normally hold the flap member in overlying relation to the belt member, said cam being formed to release the follower means after each step of rotation of the feed roller, whereby to allow the flap member to rotate to said inverted position.

7. A dispensing device comprising a housing having a front wall provided with a dispensing opening, a belt support member rotatably mounted in said housing, a flexible belt member wound on said support member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, a drive motor mounted in the housing, an upstanding forwardly exposed arm pivoted to the housing subjacent said opening, normally open switch means in the housing operatively coupled to said arm and closing responsive to inward force exerted on said arm, an energizing circuit connected to said motor through said switch means, means drivingly connecting said motor to said feed roller and including a gear on the feed roller and a sector gear driven by the motor and being meshingly engageable with said first-named gear to intermittently rotate said feed roller in steps, a flap member, means pivotally supporting said flap member forwardly adjacent said feed roller and in contact with the belt member, whereby to receive a block of food material at each step of rotation of the feed roller, and means rotating the flap member outwardly through a sufficient angle to discharge a block of food material thereon after each step of rotation of the feed roller.

8. A dispensing device comprising a housing having a front wall provided with a dispensing opening, a reel member rotatably mounted in said housing, yieldable friction means exerting rotation-retarding force on said reel member, a flexible belt member wound on said reel member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, a drive motor mounted in the housing, an upstanding forwardly exposed arm pivoted to the housing subjacent said opening, normally open switch means in the housing operatively coupled to said arm and closing responsive to inward force exerted on said arm, an energizing circuit connected to said motor through said switch means, means drivingly connecting said motor to said feed roller and including a gear on the feed roller and a sector gear driven by the motor and being meshingly engageable with said first-named gear to intermittently rotate said feed roller in steps, a flap member having a tapered end, means pivotally supporting said flap member forwardly adjacent said feed roller with said tapered end overlying and substantially in contact with the belt member, each step of rotation of the feed roller being sufficiently long to deposit a block of food material from a belt compartment onto the flap member, means biasing said flap member toward an outwardly rotated inverted position, a rotary cam coupled to the sector gear, and follower means connected to the flap member and engaging said cam to normally hold the flap member in overlying relation to the belt member, said cam being formed to release the follower means after each step of rotation of the feed roller, whereby to allow the flap member to rotate to said inverted position.

9. A dispensing device comprising a housing having a front wall provided with a dispensing opening, a belt support member rotatably mounted in said housing, a flexible belt member wound on said support member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, means to intermittently rotate said feed roller in steps, a flap member having a tapered end, means pivotally supporting said flap member forwardly adjacent said feed roller and with said tapered end overlying and in contact with the belt member, whereby to receive a block of food material at each step of rotation of the feed roller, means rotating the flap member outwardly through a sufficient angle to discharge a block of food material thereon after each step of rotation of the feed roller, a flexible cover strip overlying said flexible belt member and adapted to cover blocks of food material disposed in said compartments, roller means inwardly adjacent said opening clampingly engaging said cover strip, and means drivingly coupling said roller means to said feed roller and rotating said roller means in a direction to remove the cover strip from the belt member as the belt member is moved toward said opening.

10. A dispensing device comprising a housing having a front wall provided with a dispensing opening, a reel member rotatably mounted in said housing, yieldable friction means exerting rotation-retarding force on said reel member, a flexible belt member wound on said reel member, a feed roller journaled in the housing adjacent said dispensing opening, means on the feed roller interlocking with the belt member to feed the belt member toward the opening responsive to rotation of the feed roller, means on the belt member defining successive compartments to supportingly receive blocks of food material, a drive motor mounted in the housing, an upstanding forwardly exposed arm pivoted to the housing subjacent said opening, normally open switch means in the housing operatively coupled to said arm and closing responsive to inward force exerted on said arm, an energizing circuit connected to said motor through said switch means, means drivingly connecting said motor to said feed roller and including a gear on the feed roller and a sector gear driven by the motor and being meshingly engageable with said first-named gear to intermittently rotate said feed roller in steps, a flap member having a tapered end, means pivotally supporting said flap member forwardly adjacent said feed roller with said tapered end overlying and substantially in contact with the belt member, each step of rotation of the feed roller being sufficiently long to deposit a block of food material from a belt compartment onto the flap member, means biasing said flap member toward an outwardly rotated inverted position, a rotary cam coupled to the sector gear, follower means connected to the flap member and engaging said cam to normally hold the flap member in overlying relation to the belt member, said cam being formed to release the follower means after each step of rotation of the feed roller, whereby to allow the flap member to rotate to said inverted position, a flexible cover strip overlying said flexible belt member and adapted to cover blocks of food material disposed in said compartments, roller means inwardly adjacent said opening clampingly engaging said cover strip, and means drivingly coupling said roller means to said feed roller and rotating said roller means in a direction to remove the cover strip from the belt member as the belt member is moved toward said opening.

(References on following page)

References Cited by the Examiner

UNITED STATES PATENTS

| | | | |
|---|---|---|---|
| 708,687 | 9/1902 | Winans | 221—236 |
| 732,337 | 6/1903 | Clemons | 221—72 X |
| 1,925,502 | 9/1933 | Schaeffer | 221—72 |
| 1,949,040 | 2/1934 | Clausen | 221—77 |
| 2,187,233 | 1/1940 | Garner et al. | 221—81 |
| 2,471,055 | 5/1949 | Asbill | 221—72 |
| 2,810,652 | 10/1957 | Armbruster. | |
| 2,906,070 | 9/1959 | Shecter | 221—236 |
| 3,064,856 | 11/1962 | Council | 221—72 |
| 3,165,230 | 1/1965 | Hahn | 221—73 |

FOREIGN PATENTS

| | | |
|---|---|---|
| 983,766 | 2/1951 | France. |
| 318,803 | 9/1929 | Great Britain. |

ROBERT B. REEVES, *Primary Examiner.*

WALTER SOBIN, *Examiner.*